Jan. 18, 1938.  A F. GRIGG ET AL  2,105,971
AUTOMOTIVE RADIATOR SEALING AND PRESSURE RELIEF MEANS
Filed July 12, 1937
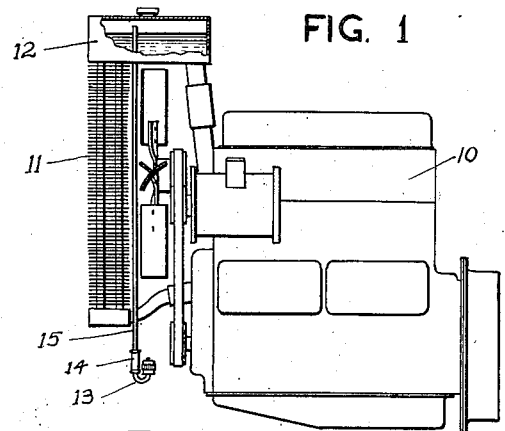
FIG. 1
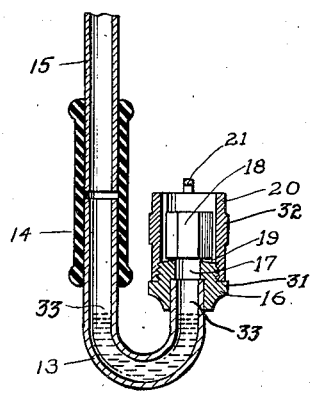
FIG. 2
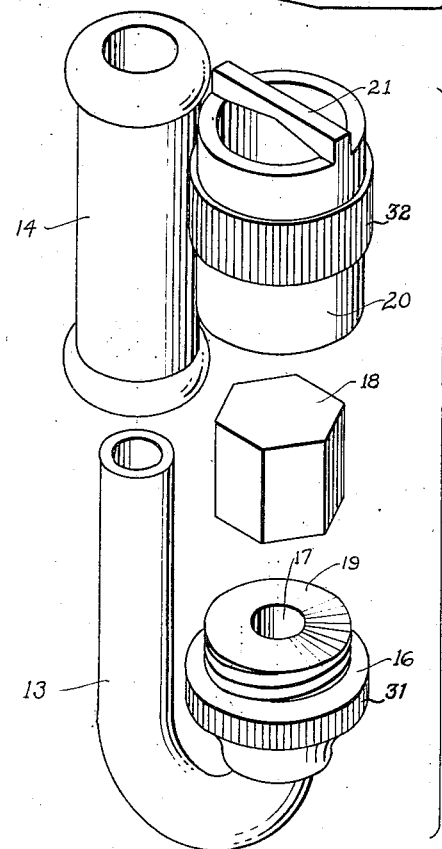
FIG. 3
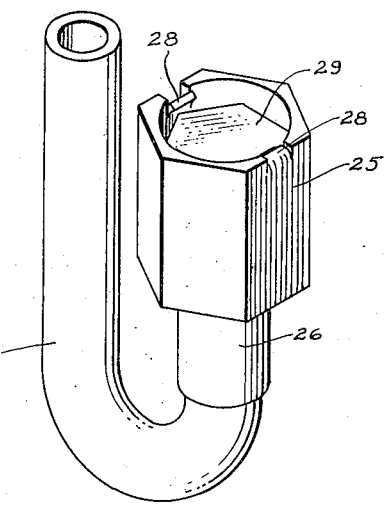
FIG. 4
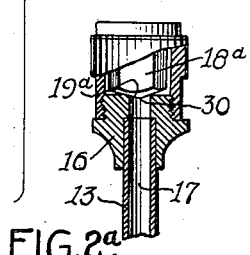
FIG. 2ª
Arthur F. Grigg
John E. Zeller
INVENTORS
BY
ATTORNEY Patented Jan. 18, 1938

2,105,971

UNITED STATES PATENT OFFICE 2,105,971

AUTOMOTIVE RADIATOR SEALING AND PRESSURE RELIEF MEANS

Arthur F. Grigg, Metuchen, and John E. Zeller, Montclair, N. J.

Application July 12, 1937, Serial No. 153,130

3 Claims. (Cl. 137—69)

This invention relates to cooling systems employing a liquid as a heat transfer medium and especially to cooling systems for automobiles and other internal combustion engines in which alcohol or other volatile liquid is used as an antifreeze. Such cooling systems generally consist of a water jacket in which the cooling liquid absorbs heat from the cylinder walls or other part to be kept cool and a radiator through which the heated liquid from the jacket is circulated and where it gives up its heat to air passed through the radiator. While systems which are closed or sealed from the atmosphere have been proposed and used experimentally, it is the universal practice to make such systems open by providing them with a vent. An overflow pipe leading from the top of the radiator generally acts as the vent and allows the system to breathe as its temperature varies and allows the escape of steam and other vapors in case the system overheats and boils.

While some means of allowing steam to escape is necessary in order to prevent bursting of the cooling system when boiling occurs, the ordinary open overflow pipe and the continual breathing which it permits result in the rapid loss, by evaporation, of any volatile portion of the cooling liquid, such as alcohol, used as an anti-freeze. To avoid the necessity of checking the alcohol and replacing that lost, many motor vehicle operators use relatively non-volatile but much more expensive anti-freeze liquids.

The principal object of this invention is to provide a device for preventing the loss of alcohol from a conventional cooling system by converting it from an open system, which breathes constantly, into a normally closed one which does not breathe during normal operation, thus preventing the loss of alcohol and making the use of alcohol as an anti-freeze much more economical than at present and removing the necessity of checking the strength of the alcohol solution more often than that of expensive, non-volatile antifreeze solutions.

Another object of this invention is to provide an extremely simple and economical safety valve for attaching to the end of the overflow pipe of a conventional cooling system to prevent breathing during normal operation but to allow the escape of steam during abnormal conditions.

Another object of this invention is to provide a device for preventing the evaporation of water from a cooling system, thus reducing the amount of water which has to be added for replacing that evaporated and reducing the amount of minerals inevitably introduced into the system with the replacement of water.

Another object of this invention is to provide a device for lessening the amount of dust and other foreign matter ordinarily drawn into the cooling system through the vent.

Another object of this invention is to provide, in combination with a pipe adapted to be normally moved and vibrated (such as an automobile radiator overflow pipe), a valve for the aforesaid purposes which will be self-cleaning and self-seating, or specifically a gravity biased valve which is free to move about on a small annular area seat to keep it clean due to the normal movements and vibrations of the said pipe.

Still another object of this invention is to provide a valve of this nature with a single flexible and elastic expansive and contractible connecting means for securing it to and supporting it from the various sizes of radiator overflow pipes and which flexible member will permit an advantageous limited swinging or vibratory movement of the valve.

Other objects of this invention will appear in the following description and appended claims, reference being had to the accompanying drawing forming a part of this specification, wherein like reference characters designate corresponding parts in the several views.

In the drawing which shows one of the preferred forms of our invention, and also other embodiments thereof, Fig. 1 is a view of one of the preferred embodiments of the invention as installed on a conventional automobile engine cooling system.

Fig. 2 is a section through the form of the invention shown in Fig. 1,

Fig. 2a is a partial section similar to Fig. 2, but showing a modification,

Fig. 3 is an "exploded" view on an enlarged scale of the form of the invention shown in Figs. 1 and 2, Fig. 4 is a view of a modified form of the invention.

Before explaining in detail the present invention, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation, and it is not intended to limit the invention beyond the terms of the several claims hereto appended as considered in view of the prior art and the requirements thereof.

The particular embodiment of the invention shown in Figs. 1 to 3 is shown installed in Fig. 1 on the cooling system of a conventional automobile engine 10 having a radiator 11 with a top tank 12. The device comprises a small U-tube 13, one leg of which is connected by a rubber sleeve 14 to the lower end of an overflow pipe 15 leading down from the top tank of the radiator. The other leg of the U-tube fits into and is soldered to a horizontal valve seat 16 which has a hole 17 in line with the bore of the U-tube, and a knurled portion 31.

It will be apparent that the elastic rubber sleeve 14 makes possible the instalation of this device on most of the varying sizes of automobile overflow pipes. Thus a single assembled valve unit including this rubber or flexible and elastic expansible and contractible sleeve 14 can be used on most automobiles as the sole supporting and connecting means for the valve. Furthermore, the flexibility of this connecting sleeve 14 permits a limited swinging or vibration of the valve 18 due to the motion and vibration of the automobile, which is advantageous as explained below.

A valve 18, consisting of a short piece of hexagonal or square rod, rests on the valve seat 16 and closes the hole 17 in it. The valve member 18 is loosely mounted in the retainer 20, as shown in Fig. 2, so that it can vibrate or move about on its seat. It will be apparent that the hexagonal or non-circular cross sectional shape of the valve member 18 provides additional space between it and the inner walls of retainer 20 to permit a free blow-off of steam or vapors. To secure a good closure, the lower end of the valve 18 may be made pointed or tapered as in an ordinary needle valve, in which case the seat could be flat, all as shown in Fig. 2a in which valve member 18a has the pointed or tapered lower end 30 resting on the flat seat 19a, or the top of the seat 16 may be made raised or slightly conical, as shown in Figs. 2 and 3, with the edge of the hole 17 higher than the surrounding surface. This latter construction lends itself to economical production because the conical surface 19 can be made quite flat and can be readily formed by the parting tool of an automatic screw machine.

In either construction it will be seen that there is a limited annular area of contact between the valve member and its seat. This structure is not as apt to be clogged or made inoperative by dirt in the valve and is readily cleaned or kept free by the lateral wiping movements of the valve member.

A slight leakage due to lack of accuracy in the fit of the valve member and its seat is not objectionable as it will serve to break any vacuum in the radiator and will not materially increase the breathing or consequent loss of alcohol and water vapor.

The valve 18 is held by its own weight against the top 19 of the valve seat and is prevented from falling off by a cage or retainer 20 which loosely encloses it, as shown. The retainer 20 is screwed against a shoulder 16a on the valve seat and has a bar 21 across its top to prevent the valve 18 from being lost. The bar 21 may be a separate piece secured to the walls of the sleeve 20, as by passing through it just below the top, but it has been found convenient to make the sleeve 20 and bar 21 integral by drilling out the end of a solid bar on a screw machine, turning down and knurling the outside, cutting off the bar just beyond the end of the drilled hole, and cross-milling the cut end of the bar to produce the shape shown in the drawing. If a less expensive structure is desired, the retainer can be made with a sloping flange projecting in all around the top, and the bottom of the retainer can be soldered to the valve seat member instead of being threaded onto it.

The knurled portions 31 and 32 provide grips for unscrewing and cleaning the valve.

The above mentioned vibration of the valve on its flexible sleeve 14 causes the valve member 18 to vibrate or move about on its seat in its clearance in retainer 20, thus keeping the small annular area seat clean and operative.

In the form of the device shown in Fig. 4, an integral valve seat and retainer 25 is provided, this piece being made with an integral stem 26 into which one leg of the U-tube 27 is soldered. The other leg of the U-tube is free to be secured to the overflow pipe of a radiator in the same way as in the form shown in Figs. 1 to 3. The upper part of the retainer has two or more portions of its rim cut free from the portions at each side to form lugs 28 which are bent inward to prevent loss of a valve 29 within the cage 25.

The valve 29 is a piece of rod, preferably non-circular, whose lower end may be either flat or pointed as may be necessary to secure proper contact with its seat as shown in Figs. 2 or 2a. The seat may be in the shape of a flat funnel formed by the end of a conventional drill used to bore out the sleeve or cage 25, in which case the valve 29 would be pointed, or the seat may be higher in the center like the seat in the form of the device shown in Figs. 1 to 3, in which case the valve 29 could be flat.

Some alcohol and water vapor will condense in the overflow pipe 15 and in the valve, and this condensate or liquid will collect in the U-tube 13 or 27, as shown by 33 in Fig. 2. This trapped liquid will serve as a liquid seal and increase the efficiency of the device.

The various forms of the device function in substantially the same way. In each form, the valve is held on its seat by its own weight, which is great enough to resist a pressure of about a quarter of a pound per square inch. As the cooling system heats up, the air in it will tend to expand and its pressure will rise until the valve is lifted and allows some air or vapor to escape. Then, when the system cools down a little, the pressure will drop. In an ordinary cooling system this will result in fresh air, perhaps dusty, being drawn back through the overflow pipe. With the present invention installed, substantially no air will be drawn in, and the pressure within the system may drop slightly below atmospheric. Then, the next time the temperature of the system rises, the pressure will rise towards atmospheric and no air will be forced out. Thus, as the temperature fluctuates, the pressure will rise and fall, but there will be little or no breathing or inflow and outflow of air carrying out alcohol and water vapors and carrying in dust and dirt as in conventional cooling systems.

What is claimed is:

1. In combination with the free end of a normally moving and vibrating pipe (such as the lower end of the conventional downwardly extending overflow and vent pipe on an automobile radiator), a pipe closing and pressure relief means including a valve, a flexible sleeve connecting and supporting said valve on said pipe, said valve having an upwardly facing valve seat with a valve opening therein, a gravity biased valve member freely resting on said seat to normally close its opening, said valve seat and said valve member being so constructed as to have only a limited annular contact area, valve member retaining means secured to said seat and loosely surrounding said valve member to permit it to partake of limited lateral cleaning movements on its limited area seat induced by the movements and vibrations of said pipe.

2. In combination with the free lower end of an upright normally moving and vibrating pipe (such as the lower end of the conventional downwardly extending overflow and vent pipe on an automobile radiator), readily attachable closing and pressure relief means comprising a short length of flexible and elastically stretchable sleeve having one end thereof stretched over the lower end of said pipe, an upright U-tube having the end of one leg thereof tightly fitted into the other end of said sleeve to flexibly and elastically support said U-tube, an upwardly facing valve seat rigidly carried on the end of the other leg of said U-tube, a gravity biased valve member above and cooperating with said seat to normally close the U-tube except for a predetermined excess pressure, valve member retaining means secured to said seat loosely surrounding said valve member to permit it to partake of a limited seat cleaning vibration due to a small swinging or flexing of the sleeve from the movements or vibration of the said pipe.

3. For use on the lower end of any one of a number of various diameters of conventional downwardly extending automobile radiator overflow and vent pipes; a short straight uniform diameter sleeve of flexible and elastically stretchable material either end of which is adapted to be stretched over the lower end of one of said various sizes of overflow pipes, an upright metal U-tube having the end of one leg fitted into the other end of said sleeve so that said sleeve is the sole supporting and connecting means therefor, an upwardly facing valve seat member rigidly secured on the other end of said U-tube, a gravity biased valve member of non-circular lateral cross-section freely resting on said valve seat to normally close said U-tube, said valve member and said valve seat being so constructed as to have only a limited annular contact area, an interiorly cylindrical retainer member removably threaded to said seat and loosely surrounding said valve member to permit limited lateral cleaning movements thereof on the seat due to a limited swinging or flexing of said flexible sleeve from the movements or vibrations of the automobile.

ARTHUR F. GRIGG.
JOHN E. ZELLER.